United States Patent [19]
Brun et al.

[11] Patent Number: 5,235,171
[45] Date of Patent: Aug. 10, 1993

[54] APPARATUS FOR READING THE STRIP OF IDENTIFICATION CHARACTERS OF A CHECK

[75] Inventors: Jean-Paul Brun, Argenteuil; Christian Dol, Gif sur Yvette; Jean-Louis Sarradin, Fontenay en Parisis, all of France

[73] Assignee: Societe d'Applications Generales d'Electricite et de Mecanique Sagem, France

[21] Appl. No.: 777,236

[22] PCT Filed: Mar. 7, 1991

[86] PCT No.: PCT/FR91/00183

§ 371 Date: Nov. 7, 1991

§ 102(e) Date: Nov. 7, 1991

[87] PCT Pub. No.: WO91/14236

PCT Pub. Date: Sep. 19, 1991

[30] Foreign Application Priority Data

Mar. 8, 1990 [FR] France .................. 90 02945

[51] Int. Cl.[5] ..................... G06K 13/06; G06K 13/24
[52] U.S. Cl. ........................ 235/483; 235/479; 235/485; 235/486
[58] Field of Search ............... 235/483, 485, 486, 479

[56] References Cited

U.S. PATENT DOCUMENTS 3,976,858  8/1976  Haun .
4,081,131  3/1978  Sand et al. ................ 235/419
4,480,181 10/1984  Fisher ...................... 235/486
4,743,746  5/1988  Murschall .................. 235/486
5,055,970 10/1991  Wrihs ....................... 235/486

FOREIGN PATENT DOCUMENTS 2169422  8/1973  France .
2505523 11/1982  France .
2515390  4/1983  France .
2579345  9/1986  France .

Primary Examiner—Harold Pitts
Attorney, Agent, or Firm—Rosenman & Colin

[57] ABSTRACT

Magnetic characters arranged in a row on a check are read in an apparatus by effecting relative linear displacement between the check and a magnetic reader. The displacement is effected either by manually removing the check from the apparatus, or by manually moving the reader.

15 Claims, 3 Drawing Sheets

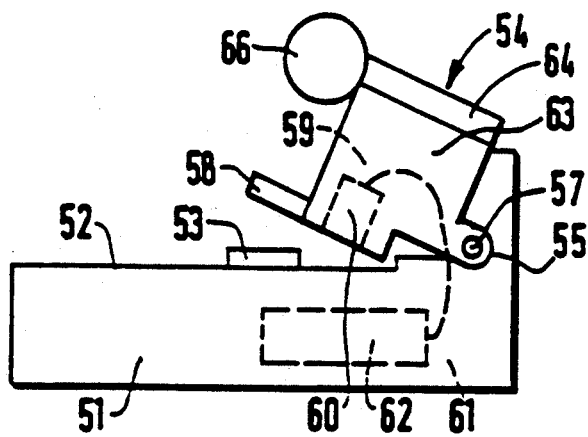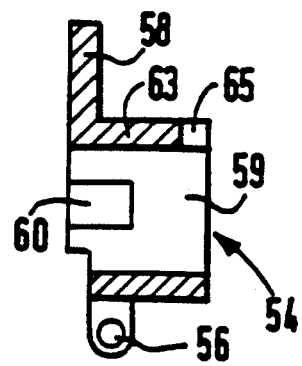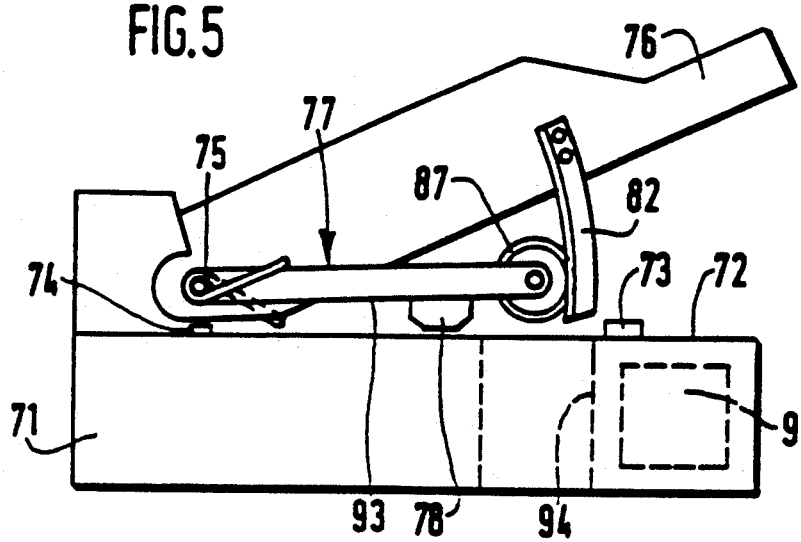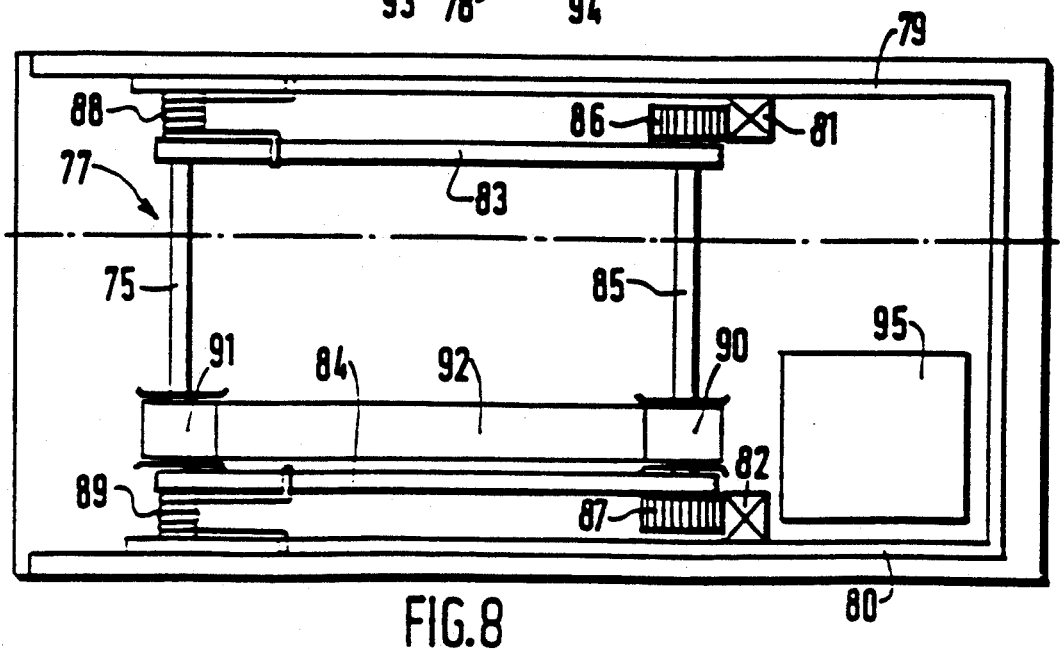

APPARATUS FOR READING THE STRIP OF IDENTIFICATION CHARACTERS OF A CHECK

BACKGROUND OF THE INVENTION

There already exist check printing apparatuses and machines which make it possible to print a transaction amount, generally in digits, on at least one place on a check. Once printed and turned over to its payee, the check, however, must be processed. In particular, as it has in its lower part a strip of identification characters, for instance CMC7 magnetic characters, representing the identity of the bank of the drawer, this strip must be read in order in this way to produce a "check image" and then process this image. It must be possible to effect this processing at a store, a bank or the like. There are devices which effect this processing. There are also devices which effect merely the noting and recording of the check image, recording being understood in the sense of the temporary or permanent storage of the data noted.

The need for such simplified apparatus is felt, in particular, in shops, particularly those where the volume of transactions is not considerable. Once the check image has been noted and recorded, it is easy to transmit it to a processing center by any means, either by sending the recording support or by transmission of the content of the recording support by any other suitable means of teletransmission, for instance, a modem and a telephone line of the public network, or a dedicated line.

These simplified apparatus are based on the principle of reading the identification strip of checks by relative linear drive of the check and a reading device along the strip, whether or not by motorized means, the check being displaced within a slot in the same manner as a bank card in a bank card machine. If the slot is too wide, the check may be bent or wrinkled and the reading may be erroneous. If the slot is too thin, it may be difficult to introduce the check into it.

SUMMARY OF THE INVENTION

The present invention is directed at overcoming these drawbacks of the simplified readers of the prior art.

For this purpose, the present invention concerns a reader for the strip of identification characters of a check which comprises a frame bearing:
  a device for reading the identification characters;
  means for electrically connecting the reading device to a support for recording the data of the strips;
  means for causing
    relative linear displacement of the check and of the reading device along the identification strip and, therefore, the reading of the strip,
which apparatus is characterized by the fact that it comprises a receiving plate adapted to receive the check and, in reading position, to cooperate with a support of the reading device in order mechanically to hold the check between the plate and the reading support.

In one particularly simple embodiment, the reading device is fixed in linear displacement and the relative displacement drive means are manual means.

In this case, the receiving plate may be provided with a cutout for grasping the check, which makes it possible to grasp it manually and to free it from the plate in order to displace it with respect to the reading device.

The reading device may then be mounted in the frame and the plate mounted pivotally on the frame.

In other embodiments of the apparatus of the invention, the reading device is mounting movably in linear displacement under the action of mechanical drive means.

Then the reading device can be mounted in a cover which is pivotally mounted on the receiving plate and has an opening for the passage of the rod of an operating knob for the reading device.

The cover may be adapted to cover the entire receiving plate or only the part thereof which is intended to receive the portion of the check containing the identification strip.

However, the apparatus can also comprise an operating arm, a reading arm which bears the reading device, and means which transform a displacement of the operating arm, preferably towards the plate, into a displacement of the reading device along the reading arm.

The operating arm and the reading arm may then be rigidly connected to each other in displacement towards the plate up to a reading position of the reading arm, the continuation of the displacement of the operating arm towards the plate from its position corresponding to the reading position of the reading arm, resulting in the displacement in one direction of the reading device along the reading arm and the plate.

Preferably, furthermore, return means drive the operating arm in a displacement which moves it away from the plate which drives the reading device in displacement in the other direction along the reading arm.

Furthermore, the operating and reading arms are preferably mounted on the frame for pivoting around the same shaft and are adapted to be connected with each other in pivoting under the action of a spring and to be pivoted towards each other against the action of the spring, the operating arm bearing a rack which engages with a pinion mounted on the reading arm in order to drive the reading device along the reading arm.

In one interesting embodiment of the apparatus of the invention, the reading device is a magnetic reading head for the strip of CMC7 magnetic characters, and a recording support for the data of the strip is provided in the apparatus.

BRIEF DESCRIPTION OF THE DRAWINGS

The invention will be better understood from the following description of several embodiments of the reading and recording device of the invention, with reference to the accompanying drawings, in which:

FIG. 5 is a front view of a third embodiment of the apparatus of the invention, with the cover open;

FIG. 6 is a cross section through the cover of the apparatus of FIG. 5;

FIG. 7 is a simplified side view of a fourth embodiment of the apparatus of the invention, the reading arm being in reading position, and FIG. 8 is a simplified top view of the apparatus of FIG. 7.

DETAILED DESCRIPTION OF THE PREFERRED EMBODIMENTS

Embodiments of the reading device of the invention which are intended to note the CMC7 strip magnetic characters of checks will now be described. It is clear that the apparatus of the invention could just as well comprise a device for reading other identification strips, such as OCRA and OCRB strips. Likewise the embodiments described below comprise integrated recording means. However, the apparatus could comprise only reading means, the characters read being transmitted for storage to an external recording support.

Figure 1:
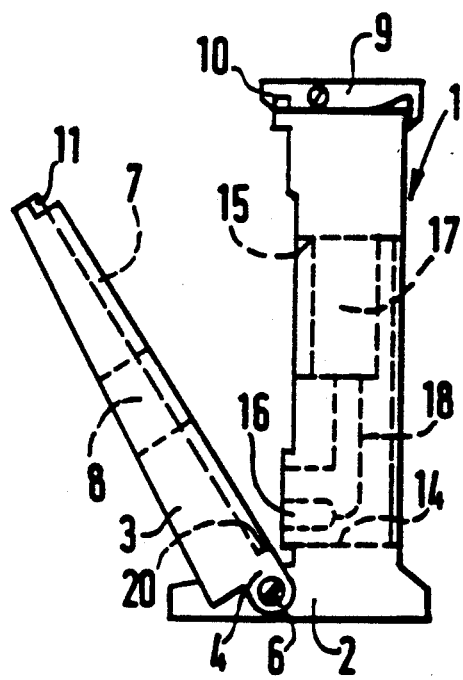
FIG. 1 is a side view of a first embodiment of the apparatus of the invention with the cover opened.
Figure 2:
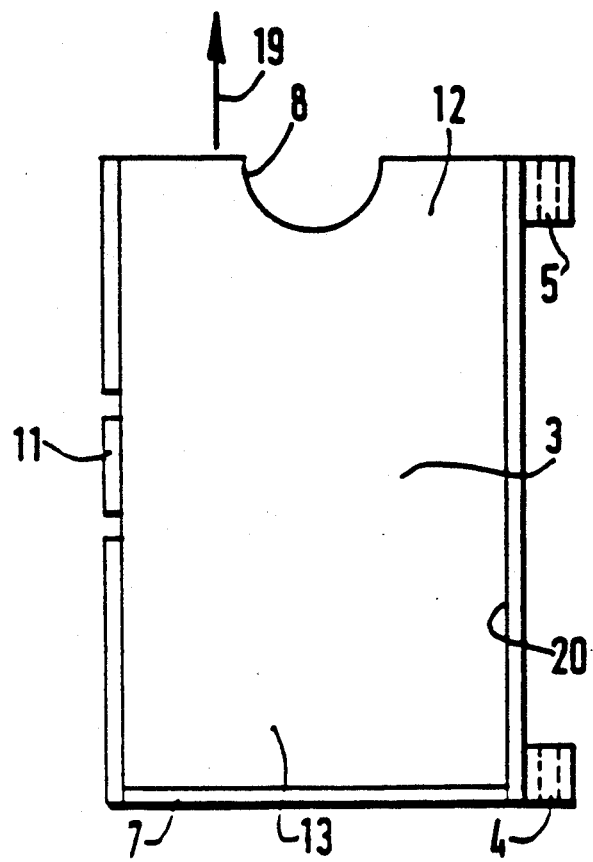
FIG. 2 is a front view of the cover of the apparatus of FIG. 1.

The apparatus of FIGS. 1 and 2 comprises a frame 1, a standing base 2, and a check receiving plate 3 mounted pivotally on the base 2 of the frame by means of two trunnions 4, 5 of the plate, arranged laterally on each side of the base 2, and a pin 6 which is force-fitted through the base 1. The frame 1 and the plate 3 are of the same width, namely that of a check, but the plate 3 is longer than the frame. The length of the plate 3 is equal to that of a check. It comprises on one side, facing the frame, a transverse shoulder 7 as transverse check stop and, on the other side, a cut-out with rounded edge 8, arranged substantially in the center, for grasping the check. It, furthermore, comprises, near its pivot shaft, a longitudinal check stop shoulder 20. In closed position, the plate 3 is folded onto the frame 1 and held in this position by a lever 9 mounted pivotally under the action of a spring on the upper part of the frame 1 and having a locking nose 10 which passes above an upper central protrusion 11 of the plate 3. In closed position, the end side portion 12 of the plate 3 in which the cut-out 8 is provided, as well as the opposite end side portion 13 along which the stop shoulder 7 extends, protrude on both sides from the frame 1. The frame 1 has recesses 14, 15 for the reception of a magnetic reading head 16 and a simple electronic recording system 17 to which the head 16 is electrically connected by a bilateral track 18.

The apparatus is used in the following manner.

The plate 3 being moved away from the frame 1, the user places a check on the plate, abutting against the shoulders 7 and 20, with its CMC7 magnetic character strip facing the frame at the lower part. The user folds the plate 3 against the frame 1. When the plate 3 is locked on the frame 1, the check is clamped slightly and held mechanically between the two of them. The check protruding out of the edge 8 of the cut-out of the plate, the user grasps it manually and pulls it in the direction of the arrow 19 in FIG. 2 in order to remove it from the apparatus and cause a relative displacement of the reading head 16 along the CMC7 strip of the check. The data of the strip are read by the head 16 and recorded by the recording system 17.

Figure 3:
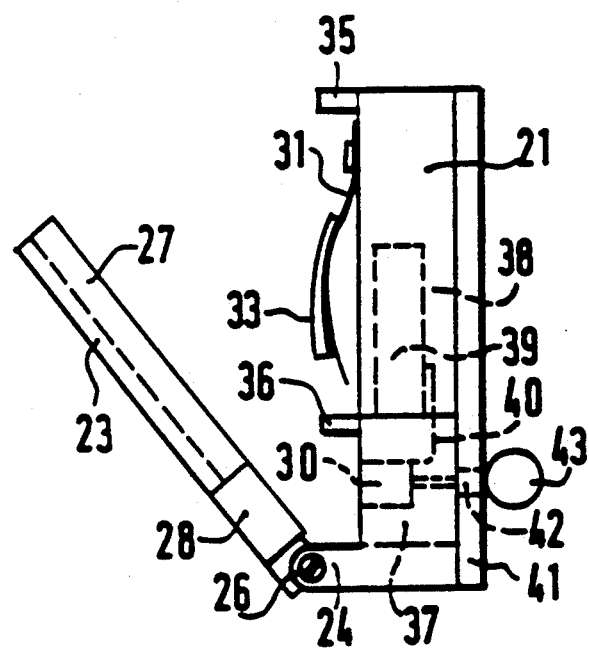
FIG. 3 is a side view of a second embodiment of the apparatus of the invention, with the cover open.
Figure 4:
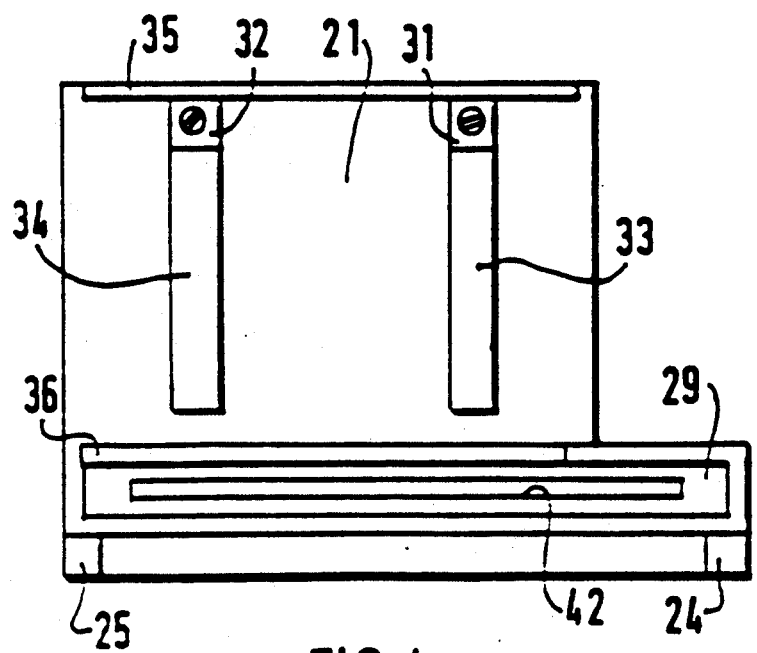
FIG. 4 is a front view of the cover of the apparatus of FIG. 3.

The apparatus of FIGS. 3 and 4 is, of course, rather similar to that of FIGS. 1 and 2 but with certain structural differences and, in particular, a drive in relative displacement of the check and the reading head which is now mechanical rather than manual. This apparatus comprises a check receiving plate 23 forming a frame and a cover 21 which is thicker and is pivotally mounted on the plate 23 by means of two trunnions 24, 25 on the cover, arranged laterally on the two sides of the plate 23, and a pin 26 force-fitted through the plate 23. The plate 23 and the cover 21, in their main structures, have a rectangular shape of width and length equal respectively to those of a check. The plate 23 has, on two sides, two transverse check stop shoulders 27. The main rectangular portions of the plate 23 and of the cover 21 are extended, along the pin 26, by smaller rectangular portions 28, 29, the portion 29 of the cover serving as housing, in position of rest, for a magnetic reading head 30. On the cover 21 are fastened here two check pressing leaf springs 31, 32 which face the plate 23, each provided with a resting shoe 33, 34. The cover 21 has two parallel longitudinal shoulders 35, 36, one shoulder 35 along the edge of the cover opposite the edge of the trunnions 24, 25 and the other 36 at a distance from the shoulder 35 equal to the width of the check. In closed position, the cover 21 is folded onto the plate 23 and covers it completely, the shoulders 27 of the plate 23 and the shoulders 35, 36 fitting in each other in order to surround the check which is clamped between the plate 23 and the pressing blades 31, 32. The cover 21 has recesses 37, 38 for the reception respectively of the reading head 30 and a simple electronic recording system 39 to which the head 30 is electrically connected by a bilateral path 40. The recess 37 for the receiving of the reading head 30 in its outer wall 41 opposite the plate 23 has a longitudinal window 42 which extends parallel to the pin 26, up into the small rectangular portion 29, for the passage of a rod of an operating knob 43 which protrudes from said wall 41 and to which the reading head 30 is rigidly attached.

The apparatus is used in the following manner:

The plate 23 being placed, for instance, on a table and the cover 21 be moved away from it, the user places a check on the plate between the shoulders 27, with its CMC7 magnetic character strip facing the cover, opposite the window 42 and, therefore, the reading head 30. The user folds the cover 21 against the plate 23. The check is enclosed between the shoulders 27 of the plate and 35, 36 of the cover and clamped between the plate and the pressing blades 31, 32. The user grasps the knob 43 and slides it along the window 42 in a reciprocating movement in order to cause a relative displacement of the reading head 30 along the CMC7 strip of the check. The data of the strip are read and recorded by the recording system 39, in this case twice, namely, upon the forward travel and upon the return travel of the operating knob 43.

The apparatus of FIGS. 5 and 6 is even more similar to that of FIGS. 3 and 4 than the latter is similar to that of FIGS. 1 and 2. This apparatus comprises a frame 51 on which a check receiving plate 52 having two transverse check stop shoulders 53 is formed. A cover 54 is pivotally mounted on the frame 51 by means of two trunnions 55, 56 on the cover 54 and a pin 57 force-fitted through the frame 51. The cover 54 and the frame 51 have the same length but, in closed position, the cover, which is not as wide as the frame, only partially covers the plate. A longitudinal shoulder 58 protrudes outside the cover so as, in closed position, to come against the plate 52 between the shoulders 53 and clamp the check between the plate and this shoulder 58. In the same way as in the apparatus of FIGS. 3 and 4, the cover 54 has a recess 59 to receive a magnetic reading head 60 and the frame 1 has a recess 61 to receive a simple electronic recording system 62 to which the reading head 60 is connected. The recess 59 for receiving the reading head has, between the housing 63 of this recess and a closure plate 64, a longitudinal window 65 which extends parallel to the pin 57 for the passage of a rod of a maneuvering knob 66 which protrudes from the housing 63 and the plate 64 and to which the reading head 60 is rigidly fastened.

The operation of the apparatus of FIGS. 5 and 6 is substantially identical to that of the apparatus of FIGS. 3 and 4.

The apparatus of FIGS. 7 and 8 comprises a frame 71 on which there is provided a check receiving plate 72 having two transverse shoulders 73, 74 spaced from each other by a distance equal to the length of a check, and on which there are pivotally mounted, on the same pin 75, an operating arm 76 and a reading arm 77 bearing a magnetic reading head 78.

In this case, the operating arm 76 is formed of a frame with two side uprights 79, 80, on which racks 81, 82 are fastened here.

The reading arm 77 is, in this case, also formed of a frame with two side uprights 83, 84 which are mounted free, on the one side, on the pivot pin 75 and connected on the other side by a cross member 85. The cross member 85 bears at its two ends, on the outside of the reading frame, two toothed pinions 86, 87 meshing with the two racks 81, 82, respectively.

Between the uprights 79, 83 and 80, 84 of the operating arm 76 and reading arm 77, on the pivot pin 75, two torsion springs 88, 89 are mounted respectively. Their ends have been bent substantially at a right angle in order to extend parallel to the pin 75. The ends of the springs extend in two secant planes, respectively, along a transverse straight line located in front of the pivot pin 75.

One of the ends of the springs 88, 89 is passed above the associated upright 83, 84 of the reading arm 77, the other end, which is crossed with the first, being passed below the associated upright 79, 80 of the operating arm 76. The cross member 85 is trunnioned in the uprights 83, 84 of the reading arm and bears, between the uprights 83, 84, a roller 90 which is fixed in rotation on the cross member 85. The pin 75 bears, between the uprights 83, 84, another roller 91 which is freely rotatable. A continuous belt 92 is extended around the rollers 90, 91. The belt 92 bears, fastened to its lower course 93 facing the plate 72, the magnetic reading head 78 which, in reading position of the reading arm 77, is substantially flush with the plate 72.

When the user pivots the operating arm 76, first of all by lifting it in order to place a check on the plate 72, due to the springs 88, 89, the reading arm 77 remains attached in pivoting with the operating arm 76. The same is true when the operating arm 76 is again lowered to the reading position of the reading arm 77, illustrated in FIG. 7, in which the reading arm 77 rests via the reading head 78 against the check. When the user continues to operate the operating arm 76 in order to pivot it towards the plate 72, the reading arm 77 remaining stationary, the springs are stressed, the racks 81, 82 which engage in the slits 94 provided in the frame 71 drive the roller 90 in rotation in one direction and the belt 92 drives the reading head 78 in displacement in a direction along the reading arm 77 and, therefore, along the check, in the present case along its CMC7 magnetic character strip. When the user releases the operating arm 76, the latter pivots upward, under the action of the springs 88, 89, moving away from the reading arm 77 up to a position of rest. During this return of the operating arm 76 into a position of rest, the racks 81, 82 turn the roller 90 in the opposite direction, which causes the return, also in opposite direction, of the reading head 78 along the reading arm. It is then sufficient to lift the operating arm 76, and with it the reading arm 77, in order to remove the check the data of the CMC7 strip of which have been read here twice by the head 78 and recorded on a recording support of a simple electronic recording system 95.

We claim:

1. An apparatus for processing a row of identification characters on a check, comprising:
   (a) a support means for supporting the check;
   (b) reader means for reading the characters;
   (c) holder means for holding the reader means;
   (d) means for mounting the support means and the holder means for movement between an open loading position in which the check is placed on the support means, and a closed reading position in which the check is mounted between the support means and the reader means on the holder means; and
   (e) displacement means for effecting relative linear displacement between the reader means and the check along the row to read the characters.

2. The apparatus of claim 1, wherein the support means includes a check-receiving plate, and wherein the holder means includes an upright stand, and wherein the mounting means pivotably connects the plate and the stand.

3. The apparatus of claim 2, wherein the plate has an abutment shoulder at one end of the plate for abutting against an edge of the check, and wherein the displacement means includes a cutout at an opposite end of the plate, said cutout overlying the check to enable manual access thereto.

4. The apparatus of claim 1; and further comprising lock means for locking the mounting means in the closed reading position.

5. The apparatus of claim 1; and further comprising recorder means on the holder means for recording data read by the reader means.

6. The apparatus of claim 1, wherein the support means includes a check-receiving plate mounted on a support surface, and wherein the holder means includes a cover, and wherein the mounting means pivotably connects the plate and the cover.

7. The apparatus of claim 6, wherein the plate and the cover have abutment shoulders abutting against edges of the check in the reading position, and wherein the displacement means includes a manually operable actuator connected to the reader means and movable relative to the check.

8. The apparatus of claim 7, wherein the cover has an elongated slot extending along the row, and wherein the actuator includes a shaft movable along the slot.

9. The apparatus of claim 7, wherein the cover has means for resiliently pressing against the check in the reading position.

10. The apparatus of claim 6; and further comprising recorder means on the support means for recording data read by the reading means.

11. The apparatus of claim 1, wherein the support means includes a check-receiving plate mounted on a support surface, and wherein the holder means includes a reader assembly, and wherein the displacement means includes an operating arm, and wherein the mounting means pivotably connects the reader assembly and the operating arm to the plate.

12. The apparatus of claim 11, wherein the operating arm includes a first pair of spaced-apart uprights on which a pair of racks are respectively mounted, and wherein the reader assembly includes a second pair of spaced-apart uprights on which a pair of pinions are respectively mounted, each pinion being in meshing engagement with a respective rack.

13. The apparatus of claim 12, wherein the reader assembly includes a drive roller in force-transmitting relationship with the racks and the pinions, a follower roller, and a belt entrained about both rollers; and wherein the reader means is mounted on the belt for joint movement therewith.

14. The apparatus of claim 12; and further comprising biasing means operatively connected between the first and second pairs of upright for constantly urging the reader assembly away from the operating arm.

15. The apparatus of claim 15, wherein the characters are magnetic, and wherein the reader means magnetically reads the magnetic characters.

* * * * *